United States Patent [19]

Peters

[11] 4,187,360

[45] Feb. 5, 1980

[54] HEAT-SHRINKABLE OR HEAT-EXPANDABLE PRODUCTS FROM HYDROGENATED POLYBUTADIENE

[75] Inventor: Thomas A. Peters, Bartlesville, Okla.

[73] Assignee: Phillips Petroleum Company, Bartlesville, Okla.

[21] Appl. No.: 597,262

[22] Filed: Jul. 18, 1975

[51] Int. Cl.$^2$ .............................................. B29H 5/01
[52] U.S. Cl. ............................. 525/339; 264/230; 264/236; 264/291; 264/320; 264/342 R; 264/347; 264/231; 264/289.3; 525/334 525/334
[58] Field of Search ............... 264/230, 232, 291, 320, 264/342 R, 236, 347, 288; 260/94.7 H, 94.7 S; 526/25, 30, 26, 21

[56] References Cited

U.S. PATENT DOCUMENTS

| | | | |
|---|---|---|---|
| 2,864,809 | 12/1958 | Jones et al. | 260/85.1 |
| 3,139,468 | 6/1964 | Wheat | 264/230 |
| 3,225,122 | 12/1965 | Stumpe | 260/94.7 H |
| 3,468,862 | 9/1969 | Schotland | 264/288 |
| 3,509,116 | 4/1970 | Cote et al. | 526/350 |
| 3,597,372 | 8/1971 | Cook | 260/4 |
| 3,629,172 | 12/1971 | Jones | 260/23.7 |
| 3,663,662 | 5/1972 | Golike et al. | 264/289 |

OTHER PUBLICATIONS

*Macromolecules*, "Synthesis & Properties of Ethylene-Butene-1 Block Copolymer", Falk et al., pp. 152–154, vol. 4, No. 2, 3—1971.

*Primary Examiner*—Jeffery R. Thurlow

[57] ABSTRACT

An article of manufacture having heat-alterable memory characteristics consisting of a shaped, vulcanized composition comprising a hydrogenated polybutadiene which in its unhydrogenated state contains from about 15 to about 55 percent trans 1,4-addition and from about 15 to about 40 percent cis 1,4-addition, the article being in a dimensionally heat-unstable condition capable of altering its physical form upon application of heat alone. The article is produced by hydrogenating the above-described polybutadiene, shaping and vulcanizing the hydrogenated polybutadiene and subjecting the shaped, vulcanized article to a force sufficient to alter its dimensions.

10 Claims, No Drawings

HEAT-SHRINKABLE OR HEAT-EXPANDABLE PRODUCTS FROM HYDROGENATED POLYBUTADIENE

This invention relates to elastomeric articles having heat-activated dimensional memory characteristics.

A number of important products have been developed in recent years based upon the property of plastic memory. One important class of materials for such use are heat-recoverable thermoplastics; i.e., materials which change their size and shape upon the application of heat without the necessity for application of external forces. These materials have the disadvantage that upon heating too long, or upon slight overheating, such thermoplastic materials will melt and relax to a new size and shape. Another important class of materials having plastic memory are crosslinked thermoplastics. These materials, being of crystalline thermoplastic nature, will exhibit thermoplastic properties while in the crystalline state and will act as elastomers only at the elevated temperatures wherein the crystals are melted.

It is an object of this invention to provide novel elastomeric articles of manufacture capable of changing size and/or shape upon the application of heat.

Another object of this invention is to provide a process for the production of elastomeric articles having dimensional memory characteristics.

Other objects and advantages of the present invention will be readily apparent from the following description and appended claims.

In accordance with the present invention there is provided an article of manufacture capable of altering its physical form upon the application of heat which consists of a shaped, vulcanized composition comprising a hydrogenated polybutadiene which in its unvulcanized state contains from about 15 to about 55 percent trans 1,4-addition and from about 15 to about 40 percent cis 1,4-addition, which article is in a dimensionally heat-unstable condition.

The novel articles of this invention are prepared by a process which comprises the steps of hydrogenating a polybutadiene containing from about 15 to about 55 percent trans 1,4-addition and about 15 to about 40 percent cis 1,4-addition, shaping and vulcanizing the thus-hydrogenated polybutadiene and then altering the shape of the vulcanized material either by stretching or by compressing the material. The vulcanized, hydrogenated polybutadiene which has been shape-altered by the process of this invention is capable, upon being heated, of shrinking or expanding, depending upon whether the particular material was stretched or compressed to approach its original unaltered shape.

Methods of preparation of suitable polybutadienes are well known. In general, butadiene is polymerized to yield the following type polymers:

(1) The 1,4-addition, forming a straight chain unsaturated hydrocarbon. This arrangement can be cis- or trans-1,4.

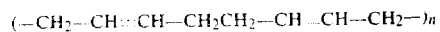

(2) The 1,2-addition, forming a saturated carbon chain with lateral vinyl groups which may be arranged regularly or irregularly.

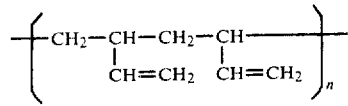

(3) The combined 1,2- and 1,4-addition.

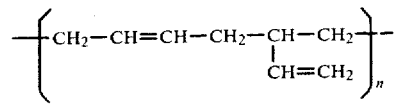

The polybutadiene used in practicing this invention contains from about 15 to about 55 percent trans 1,4-addition and about 15 to about 40 percent cis 1,4-addition, with the remainder of the polymer being formed by 1,2- addition of the 1,3-butadiene. These polymers are prepared by polymerizing butadiene in a suitable solvent (which does not adversely affect the polymerization, for example, a hydrocarbon solvent), in the presence of a suitable organo-metallic catalyst, for example, a hydrocarbyllithium catalyst and preferably in the presence of a Lewis base. The number average molecular weight of the product is in the range of 20,000 to 90,000, preferably from 30,000 to 70,000.

The lithium-based catalysts employed for the polymerization of 1,3-butadiene are metallic lithium, organolithium compounds, or other compounds of lithium in which lithium can displace hydrogen from water. Organolithium compounds, as used herein, include the various hydrocarbyllithiums, i.e., hydrocarbons in which one or more hydrogen atoms have been replaced by lithium, and adducts of lithium with polycyclic aromatic compounds. Suitable hydrocarbyllithiums include, for instance, alkyllithium compounds, such as methyllithium, ethyllithium, butyllithium, amyllithium, hexyllithium, 2-ethylhexyllithium and n-hexyldecyllithium.

The concentration of the lithium catalyst employed can vary widely depending on the particular catalyst employed, reaction conditions, the product desired, etc. For example, concentrations of catalyst, based on solvent and actual weight of lithium in the catalyst, can vary from about 0.001 to about 10 percent or greater.

Lewis bases which can be employed include ethers, thioethers, tertiary amines and the like, in concentrations of about 0.5 to about 20 percent, based on solvent. The actual concentration of the Lewis base will depend upon the particular Lewis base used and the polymer desired.

The organic ethers that are employed include alkyl, aryl, aralkyl, alkaryl and cyclic ethers such as dioxane and tetrahydrofuran. Ethers of glycols may also be employed, for example, the dimethyl ether of diethylene glycol. The corresponding thioethers and tertiary amines can also be employed.

Aromatic, aliphatic and alicyclic hydrocarbon solvents can be employed. Alicyclic solvents include cyclohexane. Aliphatic solvents include heptane, pentane, butane, hexane and the like. Aromatic solvents include benzene, toluene and xylenes.

Polymerization temperatures in the range of 10°–100° C. can be used. Pressures of atmospheric to ten or twenty atmospheres are employed so as to maintain a high concentration of the reactant in the liquid phase. The concentration of the butadiene in the solvent can vary widely such as from 5 to 75 percent.

The polymerization is carried out in an inert atmosphere, in the absence of air, carbon dioxide, oxygen and the like. It can be carried out under an atmosphere of an inert gas such as pure nitrogen, helium, argon, etc., in vacuum, or under a pressure of inert organic materials.

Hydrogenation of the above-described polybutadiene is accomplished by any of a number of hydrogenation techniques well known in the art. The polybutadiene prepared above can be directly hydrogenated without separating the polybutadiene from solution. Thereupon the hydrogenated polymer can be separated from solution by standard procedures. A number of hydrogenation catalysts can be used for hydrogenating the polybutadiene, such as nickel-kieselguhr, Raney nickel, copper chromite, molybdenum sulfide, finely divided platinum, finely divided palladium, platinum oxide, copper chromium oxide, and the like. The nickel-kieselguhr catalyst is presently preferred.

The polymers can be hydrogenated according to the following ranges of reaction conditions. Reaction pressures are preferably in the range of atmospheric to 3,000 psig. The temperature can range from about 25° C. up to the degradation temperature of the polymer. The reaction times can be in the range of 1 to 24 hours. The amount of catalyst required is a function of the temperature of hydrogenation.

The hydrogenation is carried out to such a degree that from 0.01 to about 10 percent of the original unsaturation remains. Preferably, the polymer is hydrogenated to a residual unsaturation of from about 0.1 to about 7 percent.

The hydrogenated polybutadiene is compounded in a suitable compounding recipe, which can be gum stock recipe or a recipe containing reinforcing agents. Any of the standard recipes employed for compounding synthetic rubbers can be used so long as none of the ingredients compounded with the rubber reduce the "memory" properties of the cured hydrogenated polybutadiene to an unacceptable level. Except in the case of gum stock recipes, a compounding recipe generally includes a reinforcing agent or mineral filler, such as carbon black, silica, titanium dioxide, zinc sulfide, calcium silicate, hydrated alumina or calcium carbonate. Although its presence is not mandatory, a plasticizer can be included in the recipe. Examples of suitable plasticizers include aromatic hydrocarbons, such as aromatic extract oils; petroleum softeners including asphaltenes, saturated and unsaturated hydrocarbons, and nitrogen bases; rosin; mineral rubber; coumarone-indene resins; and esters such as dibutyl phthalate and tricresyl phosphate.

The compounding recipe also includes curatives, such as a vulcanizing agent and an accelerator-activator. Examples of suitable vulcanizing agents are sulfur, a sulfur-liberating agent, such as thiuram disulfide, a thiuram polysulfide, or an alkylphenol sulfide, or a peroxide such as dicumyl peroxide or dibenzoyl peroxide. Suitable vulcanization accelerators include zinc diethyldithiocarbamate, N,N-dimethyl-S-t-butylsulfonyldithiocarbamate, tetramethylthiuram disulfide, benzothiazyl disulfide, butyraldehyde-aniline, and the like. Materials used in the recipe which function as an accelerator-activator include metallic oxides such as zinc oxide, magnesium oxide and litharge, or amines are used in addition to specific materials such as fatty acids, for example, stearic acid. When sulfur is used as the vulcanizing agent, the amount should not exceed 5 parts by weight per 100 parts by weight of the hydrogenated polybutadiene.

After preparation of the compounded stock, it is then vulcanized, the vulcanization temperature generally being in the range of 135° to 200° C. The particular temperature used in the vulcanization will be dependent upon the type of curing system used, and it is to be understood that it is not intended to limit the invention to any particular vulcanization conditions. It is also within the scope of this invention to effect the vulcanization at room temperature by using a sufficiently active curing system although such a procedure is ordinarily regarded as being impractical. Prior to the vulcanization step, the compounded stock is often formed into the shape of the article as it will be finally employed. For example, if it is desired that the article of manufacture be in the form of tubes or sheets, the compounded stock prior to vulcanization is then formed into tubes or sheets of such size and thickness as are required for the particular use.

After the compounded stock has been vulcanized, the resulting vulcanized stock is then subjected to a force which alters its original dimensions. If a heat-shrinkable product is desired, the vulcanized stock is stretched in one or both directions. There is usually no limit on the minimum amount of stretching to which the vulcanized stock can be subjected although it is usually preferred to stretch the material at least 50 percent of its original dimensions, in one or both directions, in order to obtain the maximum benefits of the heat-shrinkable property of the material. The vulcanized stock can be stretched as much as 300 percent of its original dimensions in each direction although it is usually preferred that the maximum amount of stretching be no greater than 200 percent in each direction. The stretching step can be carried out at room temperature or at elevated temperatures, e.g., between room temperature and up to about 150° C. However, when operating at temperatures above room temperature, the vulcanized stock is permitted to cool while it is still under tension in order that the material will remain in the stretched condition. When the vulcanized and stretched composition is thereafter heated to an elevated temperature, for example, a temperature in the range of 45 to 150° C., the material contracts to substantially its original shape.

It is also within the scope of this invention to change the shape of the vulcanized stock by compressing the material. It is usually preferred to carry out the compression step with the vulcanized stock at an elevated temperature, e.g., at a temperature between room temperature and 150° C., in order that the stock will be soft and easy to compress. Thereafter, the compressed object is allowed to cool under compression in order that the material will remain in its compressed shape after compression is relieved. When the compressed vulcanized stock is thereafter heated, e.g., to a temperature in the range of 45 to 150° C., it will return to substantially its original shape. The amount that vulcanized stock can be compressed in this manner will depend to a certain extent upon the shape of the object to be compressed. However, articles which are substantially cylindrical in shape can be compressed to 25 percent or less of their original height and then recover more than 60 percent of their original height upon being heated.

The vulcanized and stretched compositions of this invention are particularly useful as wrapping or sealing materials. Either before or after the stretching step, tubes of the vulcanized stock can be cut to form bands or sleeves, and sheets of the vulcanized stock can be cut into strips to form tape or into sheets of any desired dimension for the packaging material. After the vulcanized and stretched composition has been applied to the material to be wrapped or sealed, the assembly is subjected to an elevated temperature as hereinbefore described. This heating step causes the polybutadiene composition to contract and form a tight covering around the object to which it has been applied. The temperature used in the shrinking step will be governed, at least in part, by the type of material to which the polybutadiene composition is applied. Care must be taken to insure that the object being covered or wrapped does not become distorted at the temperature used.

The vulcanized and compressed polybutadiene compositions of this invention can also be used in a variety of applications. In one important application, a compressed polybutadiene is used to prepare a gasket which is subjected to elevated temperatures. As the temperature is increased, the gasket formed of the compressed material of this invention expands and fills any voids, thereby making a very tight seal. The following example illustrates the invention:

EXAMPLE

The following runs illustrate the practice of this invention utilizing polybutadienes prepared in a solution polymerization system utilizing n-butyllithium as initiator and tetrahydrofuran to vary microstructure and subsequently hydrogenated over a nickel catalyst. Table I gives the properties of the parent and hydrogenated polybutadiene.

Table I

| Polybutadiene | A | B | C | D | E |
|---|---|---|---|---|---|
| Parent | | | | | |
| Trans %$^a$ | 19.2 | 16.5 | 30.2 | 40.1 | 52.7 |
| Vinyl %$^a$ | 61.2 | 68.9 | 46.0 | 27.4 | 9.8 |
| Mw/Mn$^b$ | 104/81 | e | 70/61 | 45/40 | e |
| Inh. Visc.(Gel%)$^c$ | 1.02(0) | e | 0.9(0) | 1.04(0) | e |
| Hydrogenated | | | | | |
| Trans %$^d$ | 10.1 | 6.1 | 3.7 | 0.9 | f |
| Vinyl %$^d$ | 0.3 | 0.2 | 0.7 | 0 | f |
| Mw/Mc | 80/62 | 95/60 | 82/56 | 79/51 | f |
| Inh. Visc.(Gel%) | 0.7(0) | 0.5(0) | 0.69(0) | 0.86(0) | f |

$^a$Determined according to the method described in Anal. Chem., 31, 529 (1959).
$^b$In thousands. Determined using a calibrated gel permeation chromatography instrument.
$^c$Determined according to the porcedure of U.S. Pat. No. 3,278,508, col. 20, notes a and b using tetrahydrofuran as solvent.
$^d$No cis unsaturated detected.
$^e$Not determined.
$^f$Not determined due to limited solubility in approproate solvents.

The above-described hydrogenated polymers and other ingredients given in the following recipe were mixed on a roll mill and cured at 160° C. for 30 minutes. Properties of the cured stocks are given in Table II.

The cured stocks were elongated at 100° C. and cooled to room temperature while elongated. Upon release of tension the stocks remained in an elongated state. Upon reheating to 100° C. the stocks recovered their original length to the extent given in Table II as Recovery, %.

| Recipe | Parts by Weight |
|---|---|
| Hydrogenated polymer | 100 |
| Carbon black$^a$ | 20 |
| Naphthenic oil | 5 |
| Zinc oxide | 3 |

-continued

| Recipe | Parts by Weight |
|---|---|
| Stearic acid | 1 |
| Antioxidant$^b$ | 1 |
| Sulfur | 1.5 |
| Benzothiazyl disulfide | 0.6–1.0 |
| Accelerator$^c$ | 1.0–1.5 |

$^a$N339 - improved structure high abrasion furnace black.
$^b$Polymerized 1,2-dihydro-2,2,4,-trimethylquinoline.
$^c$Proprietary material desciebed as a phosphoryl disulfide (Marketed by DuPont and referred to as LD-071).

Table II

| Cured stock$^a$ | A | B | C | D | E |
|---|---|---|---|---|---|
| Tensile, psi$^b$ | 630 | 1110 | 1300 | 2850 | 1960 |
| 200% Modulus, psi$^b$ | 620 | 875 | 550 | 640 | 1425 |
| 300% Modulus, psi$^b$ | d | d | 900 | 820 | 1640 |
| Elongation, %$^b$ | 200 | 240 | 200 | 760 | 460 |
| Shore A Hardness | 53 | 66 | 60 | 77 | 85 |
| Recovery, % | e | 80 | 71 | 100 | 68 |

$^a$Designation A, B, C, D and E correspond to designatios of polymers in Table I.
$^b$Determined according to ASTM D-412-66.
$^c$Determined according to ASTM D-2240-68.
$^d$Not available.
$^e$Specimen broke during elongation at 100° C.

Compression-set pellets of cured stocks A, B, C and D were compressed at 100° C. and cooled to room temperature under compression. Upon release of tension the specimens remained in a compressed state. Upon reheating to 100° C., A, B, and C partially recovered their original shape and D recovered its original shape fairly well.

Hydrogenated polybutadienes D and E were also cured at 160° C. using only a peroxide vulcanizing agent. The cured stocks possessed "memory" characteristics as described above for sulfur-cured stocks.

The above data and observations illustrate the operability of the invention. The cured hydrogenated polybutadienes possessed "memory" characteristics and were capable of having their shapes altered by heat treatment and subsequent cooling under tension. Heat treatment of the shape-altered objects caused the shapes of said objects to approach their original dimensions.

Reasonable variations and modifications, which will be apparent to those skilled in the art, can be made in this invention without departing from the spirit and scope thereof.

What is claimed is:

1. A process for producing a dimensionally heatunstable article which comprises:
   (a) hydrogenating to 0.01 to about 10 percent residual unsaturation a polybutadiene which, prior to hydrogenation, contains from about 15 to about 55 percent trans 1,4-addition and from about 15 to about 40 percent cis 1,4-addition, and thereafter recovering the resulting hydrogenated polybutadiene;
   (b) shaping and vulcanizing said hydrogenated polybutadiene, and thereafter recovering the resulting shaped, vulcanized article; and
   (c) subjecting said shaped, vulcanized article to a force sufficient to alter its dimensions at a temperature between room temperature and 150° C., said force being maintained for a time sufficient to allow the resulting shape-altered article to cool to room temperature, and thereafter recovering the resulting dimensionally heat-unstable article.

2. The process of claim 1 wherein said shaped, vulcanized article is dimensionally altered by stretching same.

3. The process of claim 2 wherein said article is stretched between 50 and 300 percent of its orginal dimensions.

4. The process of claim 1 wherein said shaped, vulcanized article is dimensionally altered by compression.

5. The process of claim 1 wherein said polybutadiene has a molecular weight in the approximate range of 20,000 to 90,000.

6. The process of claim 1 wherein said polybutadiene in its unvulcanized, unhydrogenated state contains about 19.2 percent trans 1,4-addition and about 19.6 percent cis 1,4-addition.

7. The process of claim 1 wherein said polybutadiene in its unvulcanized, unhydrogenated state contains about 16.5 percent trans 1,4-addition and about 14.6 percent cis 1,4-addition.

8. The process of claim 1 wherein said polybutadine in its unvulcanized, unhydrogenated state contains about 30.2 percent trans 1,4-addition and about 23.8 percent cis 1,4-addition.

9. The process of claim 1 wherein said polybutadiene in its unvulcanized, unhydrogenated state contains about 40.1 percent trans 1,4-addition and about 32.2 percent cis 1,4-addition.

10. The process of claim 1 wherein said polybutadiene in its unvulcanized, unhydrogenated state contains about 52.7 percent trans 1,4-addition and about 37.5 percent cis 1,4-addition.

* * * * *